United States Patent [19]
Almy

[11] Patent Number: 5,673,273
[45] Date of Patent: Sep. 30, 1997

[54] CLOCK CONTROLLER FOR EMBEDDED TEST

[75] Inventor: Thomas A. Almy, Tualatin, Oreg.

[73] Assignee: Tektronix, Inc., Wilsonville, Oreg.

[21] Appl. No.: 640,369

[22] Filed: Apr. 30, 1996

[51] Int. Cl.$^6$ .................................................. G01R 31/28
[52] U.S. Cl. .......................... 371/22.1; 371/22.3; 327/286
[58] Field of Search ........................... 371/22.1, 22.3, 371/27; 324/158.1, 73.1, 750, 681; 395/550, 200; 327/286, 279

[56] References Cited

U.S. PATENT DOCUMENTS

| | | | |
|---|---|---|---|
| 5,276,857 | 1/1994 | Hartung et al. | 395/550 |
| 5,341,091 | 8/1994 | Kurita | 324/750 |
| 5,343,478 | 8/1994 | James et al. | 371/22.3 |
| 5,428,626 | 6/1995 | Frisch et al. | 371/27 |
| 5,448,575 | 9/1995 | Hashizume | 371/22.3 |
| 5,488,325 | 1/1996 | Sato et al. | 327/286 |
| 5,519,714 | 5/1996 | Nakamura et al. | 371/22.3 |

Primary Examiner—Robert W. Beausoliel, Jr.
Assistant Examiner—Nadeem Iqbal
Attorney, Agent, or Firm—Boulden G. Griffith

[57] ABSTRACT

An embedded electronic system includes a clock controller embedded in the same matrix material as a subsystem under test and the measurement devices needed to test it. This embedded clock controller controls the distribution and gating of a system clock that runs continuously, but is only supplied to the subsystem under test during normal operation or during pre-programmed intervals of testing operations. A test data bus supplies test data and a path for the return of test results. The test data supplied to the clock controller includes information to control time relationships between its trigger and gated clock outputs. Different versions of the clock controller are described, one for use with a serial test data bus and another for use with a parallel test data bus. The clock controller can also be configured to produce trigger signals with timing appropriate to operating either edge-sensitive or level-sensitive measurement devices. Also, new test commands can be loaded while a previous test is running, or tests can be repeated without changing the test data supplied. Multiple clock controllers can be configured to control the operation of multiple measurement devices in various timing relationships.

9 Claims, 8 Drawing Sheets

CLOCK CONTROLLER FOR EMBEDDED TEST

STATEMENT REGARDING FEDERALLY SPONSORED RESEARCH AND DEVELOPMENT

This invention was made with U.S. Government support and the United States has certain rights in this invention.

FIELD OF THE INVENTION

This invention relates to embedded testing of electronic circuitry, and more particularly to an embedded clock controller suitable for use with embedded test circuits.

BACKGROUND OF THE INVENTION

U.S. Pat. No. 5,428,626 to Frisch et al. for "Timing Analyzer for Embedded Testing", hereby incorporated by reference, describes a timing analyzer and the embedded testing environment that it works in. This embedded timing analyzer requires a periodic clock signal as one of its inputs. In the past, this periodic clock signal has been provided by external test equipment, such as a programmable clock generator, that can provide a gated clock signal. But external test equipment is bulky and inconvenient to use, and its use is inconsistent with the overall desire to embed the necessary test equipment within the same medium as the circuitry to be tested.

SUMMARY OF THE INVENTION

The present invention provides an embedded electronic system that includes a clock controller embedded in the same matrix material as a subsystem under test and the measurement devices needed to test it. This embedded clock controller controls the distribution and gating of a system clock that runs continuously, but is only supplied to the subsystem under test during normal operation or during pre-programmed intervals of testing operations. A test data bus supplies test data and a path for the return of test results. The test data supplied to the clock controller includes information to control time relationships between its trigger and gated clock outputs. Different versions of the clock controller are described, one for use with a serial test data bus and another for use with a parallel test data bus. The clock controller can also be configured to produce trigger signals with timing appropriate to operating either edge-sensitive or level-sensitive measurement devices. Also, new test commands can be loaded while a previous test is running, or tests can be repeated without changing the test data supplied. Multiple clock controllers can be configured to control the operation of multiple measurement devices in various timing relationships.

DETAILED DESCRIPTION OF THE INVENTION

Detailed Description

Figure 1:
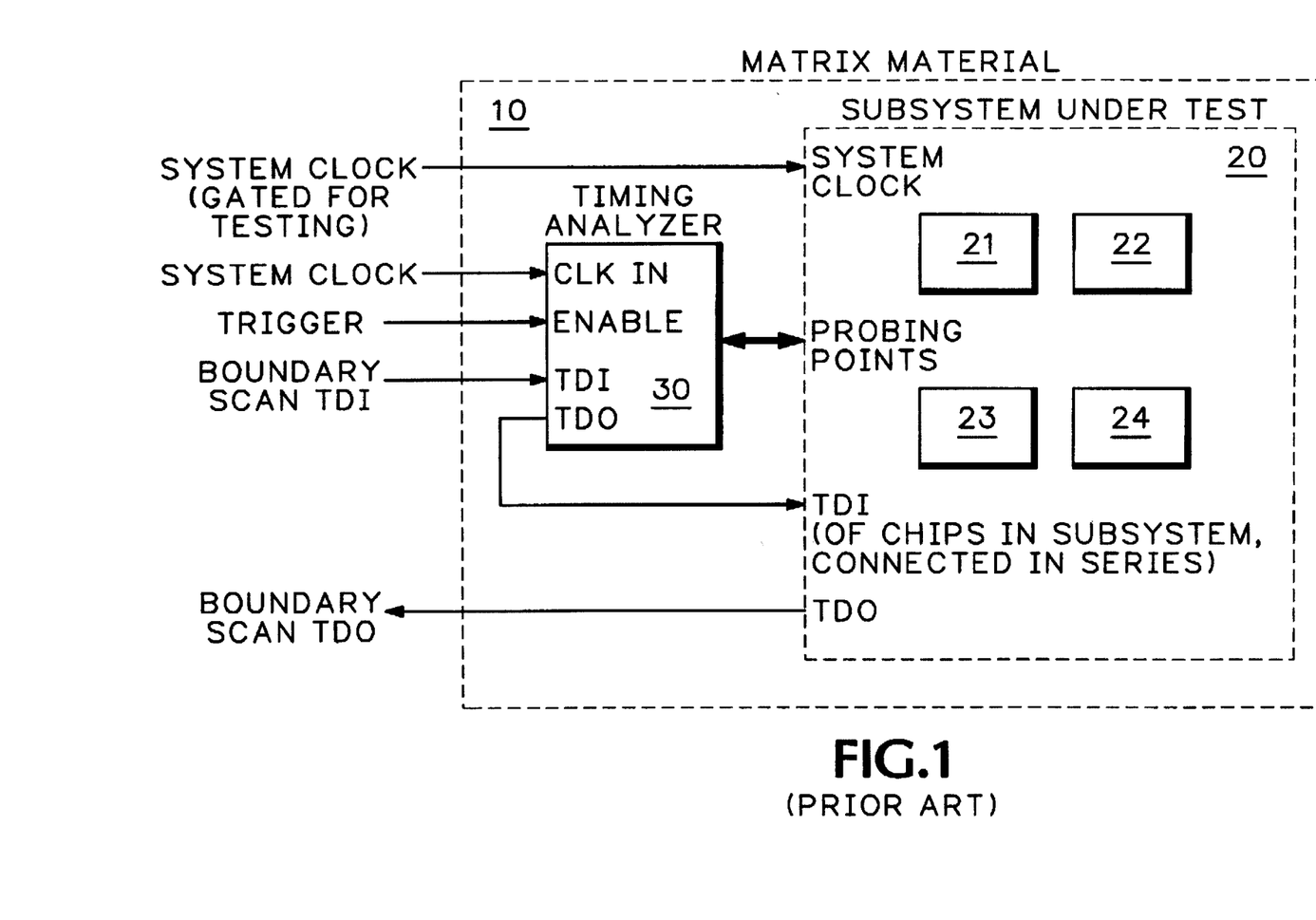
FIG. 1 is a conceptual block diagram of a subsystem under test and an embedded timing analyzer according to the prior art.

FIG. 1 shows matrix material 10 that is an environment for embedded testing. According to the prior art, both a Subsystem Under Test and a Timing Analyzer 30 needed to test it are shown embedded in the matrix material. This matrix material could be silicon or some other semiconducting material, or printed circuit board material, or any other material used to construct integrated circuits, electronic circuit boards, or multi-chip modules. Stated another way, this matrix material could be any substrate material into which electronic circuitry can be embedded.

Furthermore, while Timing Analyzer 30 is shown as a representative example, various types of embeddable electrical test circuitry could be used in its place. Such circuitry could include logic analyzers, waveform digitizers, arbitrary waveform generators, test vector generators, pattern recognizers, etc. Any electrical test circuitry that stimulates or analyzes data from another electrical circuit could fill the role of the Timing Analyzer 30 shown in FIGS. 1 and 2. The Timing Analyzer 30 shown has its inputs coupled to monitor test points associated with components 21–24 of the Subsystem Under Test 20.

Figure 2:
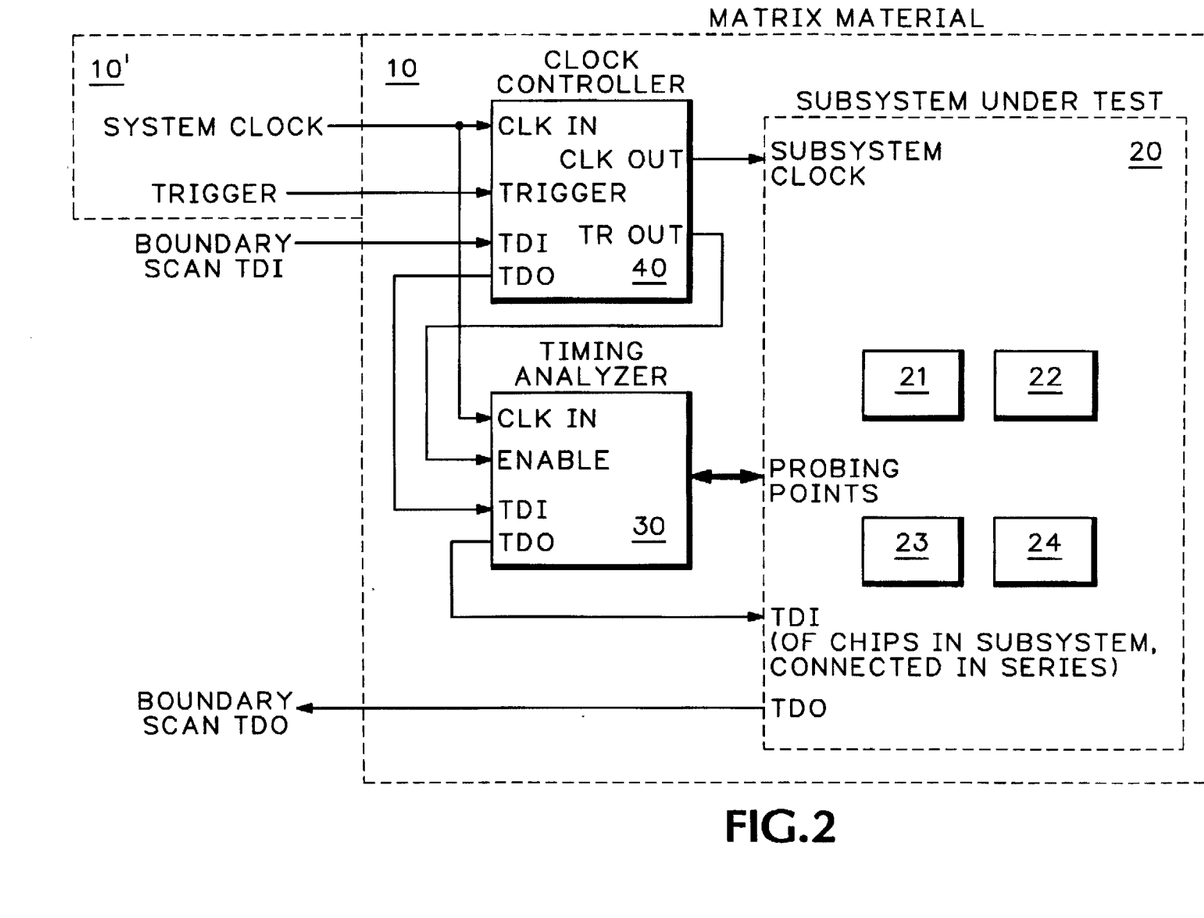
FIG. 2 is a conceptual block diagram of an embedded subsystem under test, an embedded timing analyzer, and an embedded clock controller according to the present invention.

Referring next to FIG. 2, according to the present invention a Clock Controller 40 is now embedded in the matrix material 10' along with the Subsystem Under Test 20 and the Timing Analyzers 30. Again, as above, the matrix material 10 may be silicon based semiconductor or some other type of semiconductor material, or could be some type of printed circuit board material, or could be any other material used to construct integrated circuits, electronic circuit boards, or multi-chip modules.

The Clock Controller 40 has a Clock Input and a Clock Output, a Trigger input and a Trigger Output, and a Test Data Input and a Test Data Output. The Timing Analyzer 30 has a Clock Input and an Enable input, as well as a Test Data Input and a Test Data Output. The system clock that is the Clock Input to the Clock Controller 40 may originate outside of the matrix material 10,10' or within a portion of the matrix material 10' which is optionally a part of the matrix material 10. The Clock Controller 40 uses the system clock to produce a Clock Output that is the Subsystem Clock for the Subsystem under test 20. In response to its Trigger Input, the Clock Controller 40 produces a Trigger Output signal that is coupled to the level-sensitive Enable Input of the Timing Analyzer 30. As will be further described below, a measurement device in the place of the Timing Analyzer 30 might be edge-sensitive rather than level sensitive, in which case the Trigger Output signal would be coupled to a Trigger input of such a device. Generically, such an input can then be referred to as a "Trigger/Enable input".

The test data inputs and outputs are shown in FIG. 2 as being "boundary scan", but could be any type of serial (or even parallel) test data associated with any type of embedded testing method. The test data in (TDI) consists of setup commands and parameters for the electrical test circuitry and the subsystem under test 20 components 21–24 to be tested. The commands and parameters for the Timing Analyzer 30 consist of information defining the logic levels and timing intervals at which pins are to be driven and results collected. The Clock Controller 40 receives an enable flag and time intervals during which clocks are to be gated out and the Trigger Output is to be generated. For Built-In-Self-Test (BIST), the test data inputs to the components 21–24 consists of test vector "seeds" and other setup information, and the results are test signatures.

Figure 3A:
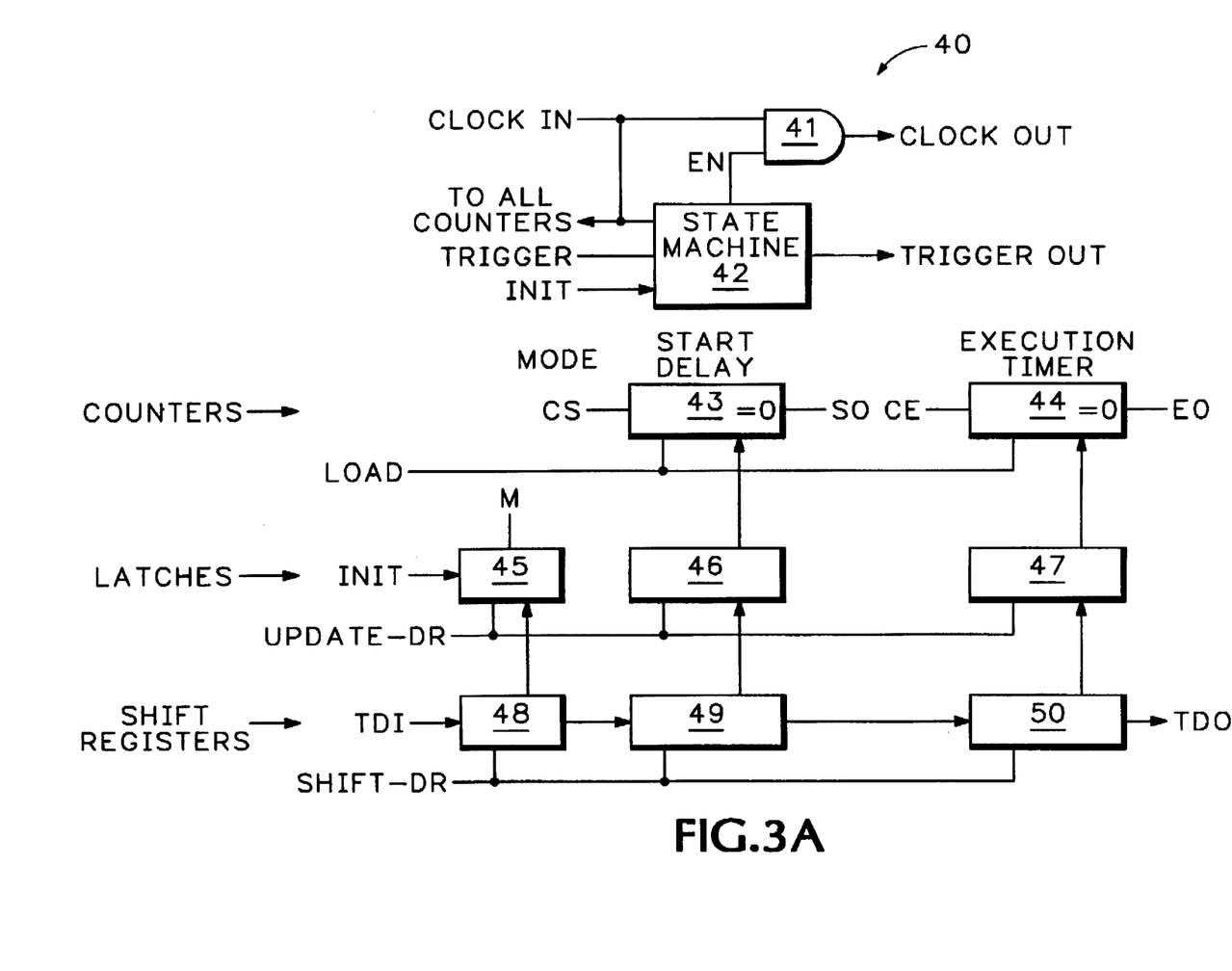
FIG. 3A is a block diagram of a clock controller according to the present invention supplied with test data via a boundary scan type serial bus.
Figure 3B:
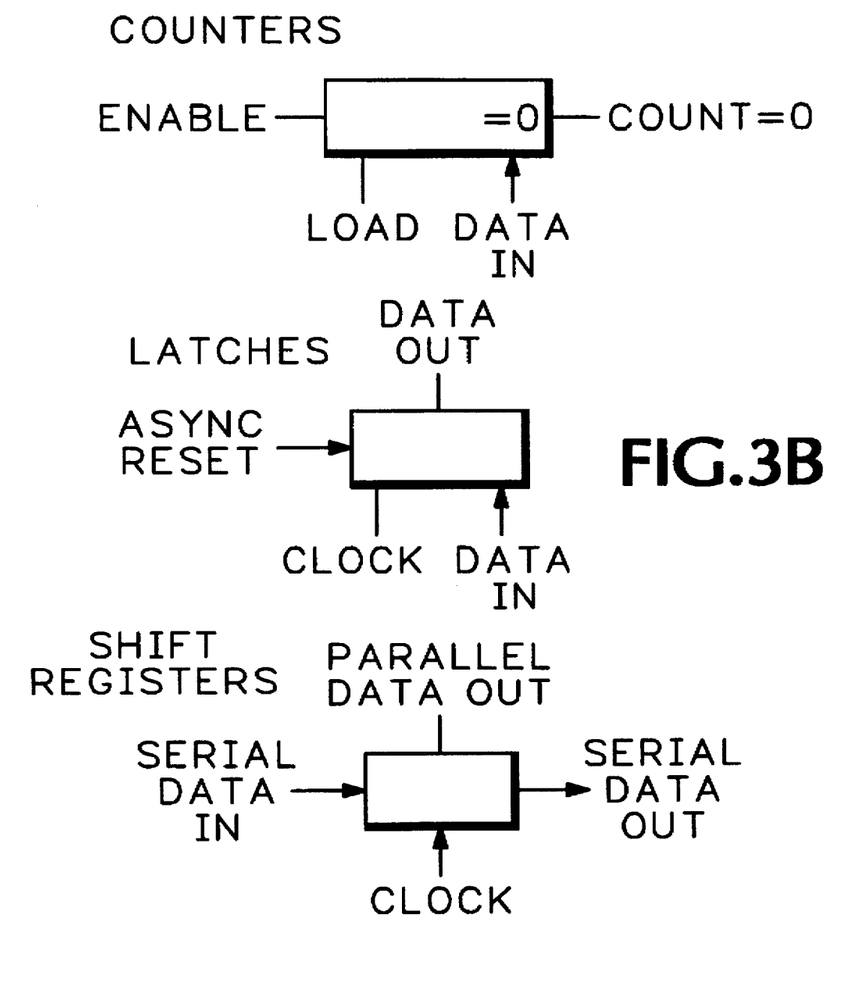
FIG. 3B is an reference diagram explaining how the corresponding component blocks in FIG. 3A are affected by their various respective inputs.

Referring now to FIGS. 3A and 3B, FIG. 3B is an reference diagram explaining how the corresponding component blocks in FIG. 3A are affected by their various respective inputs. Counters 43 and 44 are shown with a count enable input coming from their left, load enable and parallel data inputs coming from below, and the count equals zero (or terminal count) signal leaving via their right side. Latches 45, 46, and 47 are shown with clock and data inputs coming from below, an asynchronous reset input coming from the left, and the data out leaving out the top. And, shift registers 48, 49, and 50 are shown with serial data arriving from the left and leaving to the right, a clock signal being supplied from below, and parallel data being presented upwardly. In FIG. 3A, LOAD, CS, SO, CE, and EO are signals connected to the state machine 42. TDI, TDO, UPDATE-DR, and SHIFT-DR are signals which are part of the boundary scan circuitry.

Figure 4:
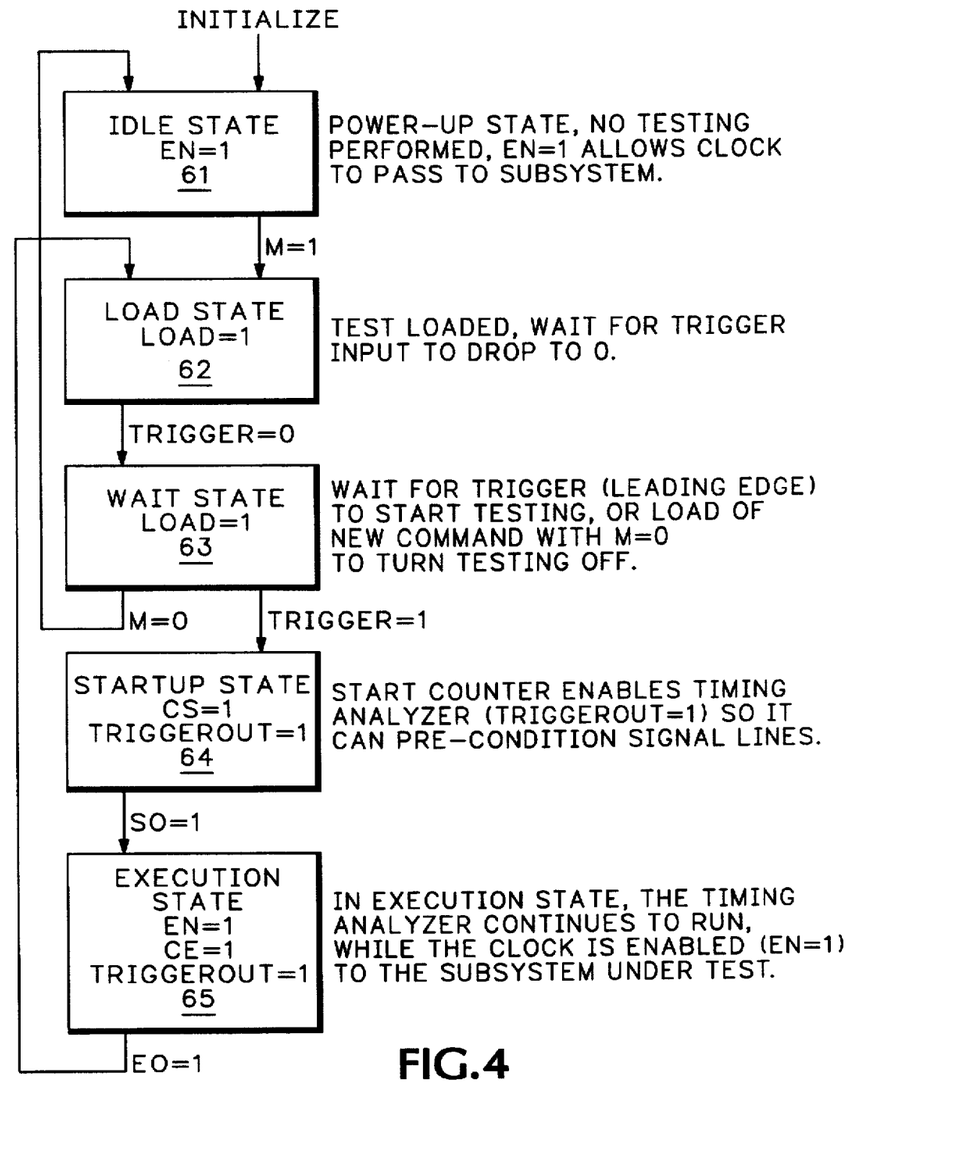
FIG. 4 is a state diagram illustrating the operation of the clock controller state machine.

Referring next to FIGS. 3A and 4, it can be seen that FIG. 3A is a block diagram of the Clock Controller 40 according to the present invention, while FIG. 4 is a state diagram illustrating the operation of a state machine 42 within the Clock Controller. The operation of the Clock Controller 40 will now be discussed with reference to these Figures. As can be seen in FIG. 4, an initialization signal INIT puts the Clock Controller 40 state machine 42 into its Idle State 61. This is the state of the state machine 42 during normal (non-test) operation. In the Idle State the enable signal EN is held high (=1) and Clock Input signals are enabled through AND gate 41 where they become Clock Out signals, as shown in FIG. 3A. This allows normal operation of the Subsystem under test before any testing is initiated.

Referring now to the lower portion of FIG. 3A, serial test data in (TDI) passes through registers 48, 49, and 50 as it is clocked by SHIFT-DR and then becomes test data out (TDO). When the serial data stream TDI/TDO is in the proper location, the data in registers 48, 49, and 50 is clocked into latches 45, 46, and 47, respectively, by UPDATE-DR. If the value in the M latch 45 after this occurs is a "1", the Clock Controller 40 transitions from its Idle State 61 into its Load State 62, and LOAD goes high (=1). LOAD going high causes the data in latch 46 to be transferred to Start Delay counter 43. LOAD going high also causes the data in latch 47 to be transferred to Execution Timer 44. If the Trigger signal is low at this point, the Clock Controller 40 advance to Wait State 63 and is ready to go to Startup State 64 when the Trigger (input) signal goes high. If the Trigger (input) signal is high, the state machine 42 will not advance to the Wait State 63 until the Trigger (input) signal goes low.

The arrival of a Trigger Input, TRIGGER=1, causes the state machine 42 to go from its Wait State 63 to its Startup State 64. Being in the Startup State 64 causes CS and TRIG OUT to go high. CS=1 causes the Start Delay counter 43 to start its countdown. The value preloaded into the Start Delay counter 43 determines the time between the arrival of a Trigger Input and the beginning of production of Clock Out signals. In general, the Start Delay time should be long enough to allow the Timing Analyzer 30 (and any other embedded test equipment) to be initialized in response to the Trigger Output signal.

When the Start Delay counter 43 reaches its terminal count, SO goes high. SO=1 causes the state machine 42 to transition from the Startup State 64 to the Execution State 65. Being in the Execution State 65 causes EN=1, CE=1, and TRIG OUT=1. EN=1 enables AND gate 41 (FIG. 3A) and thereby allows Clock Out signals to be produced. CE=1 causes the Execution Timer 44 to start its countdown. The value preloaded into the Execution Timer 44 determines how long Clock Out signals will be produced, i.e., the "on" time for the gated output of Clock Out signals. When the Execution Timer 44 reaches its terminal count EO goes high. EO=1 causes the state machine 42 to leave its Execution State 65 and return to Load State 62. Departing from Execution State 65 causes EN, CE, and TRIG OUT to all go low again. EN=0 disables AND gate 41 and thereby shuts off the Clock Out signals.

Because LOAD=1 continues during the Wait State, the cycle of loading, waiting, starting-up, and executing can be continuously repeated with or without changing the values of the delays via TDI/TDO. If no new values are shifted in, the Clock Controller 40 will repeat the last cycle when Trigger goes active again. If new values are shifted in before the next Trigger, the resulting next cycle will reflect those new values. The requirement that TRIGGER=0 before the state machine 42 leaves the Load State 62 and enters the Wait State 63 prevents problems when the Trigger Input does not return to zero before the previous test is complete. Testing is stopped by moving a "0" into register 48 using SHIFT-DR and then moving that "0" to latch 45 using UPDATE-DR. The resulting M=0 takes the state machine 42 from its Wait State 63 to its Idle State 61.

Figure 5:
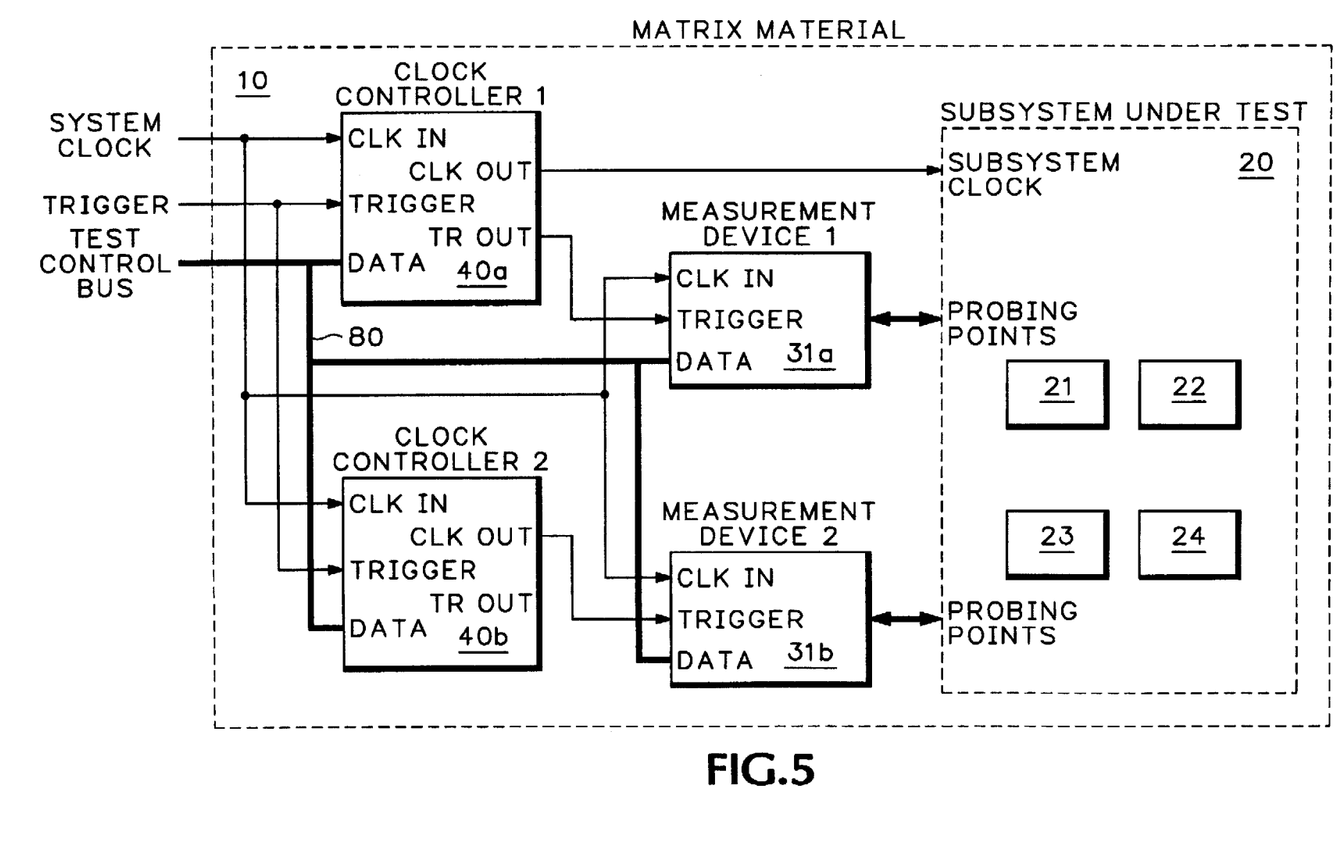
FIG. 5 is a conceptual block diagram of a subsystem under test and two embedded generic electronic measurement devices and two clock controllers according to the present invention, with test data supplied via a parallel bus.

Referring now to FIG. 5, there can be seen a conceptual block diagram of a Subsystem under test 20 and two embedded generic electronic Measurement Devices 31a,31b and two Clock Controllers 40a,40b according to the present invention. In addition to the additional Clock Controller 40b, this embodiment of the invention shows several things that are different from what is shown in FIG. 2. Instead of a specific electronic measurement device such as the Timing Analyzer 30 shown in FIG. 2, we now have two generic electronic Measurement Devices 31a and 31b. As was explained previously, such generic electronic test circuitry could include logic analyzers, waveform digitizers, arbitrary waveform generators, test vector generators, pattern recognizers, or any other electronic measurement device that stimulates or analyzes data from another electrical circuit. And, instead of using boundary scan TDI/TDO as in FIG. 2, the embedded circuitry shown in FIG. 5 utilizes a parallel Test Control Bus 80 supplying commands and test data to the Clock Controllers 40a,40b and Measurement Devices 31a,31b, and retrieving test results from those Measurement Devices. The Measurement Devices 31a/31b are shown as having Trigger inputs, signifying that they are edge-sensitive, rather than level-sensitive as were the Timing Analyzers 30 shown in FIG. 2.

Clock Controller 2 40b provides a Trigger Out signal to the Trigger input of Measurement Device 2 31b. By pre-loading Clock Controller 2 40b with a different Start Delay value than that provided to Clock Controller 1 40a, Measurement Device 2 31b can be caused to start its operations at a different time than Measurement Device 1 31a because the timing of the Trigger Out signals is determined by the Start Delay value. The Subsystem under test 20 still receives its Subsystem Clock exclusively from Clock Controller 1 40a.

Figure 6:
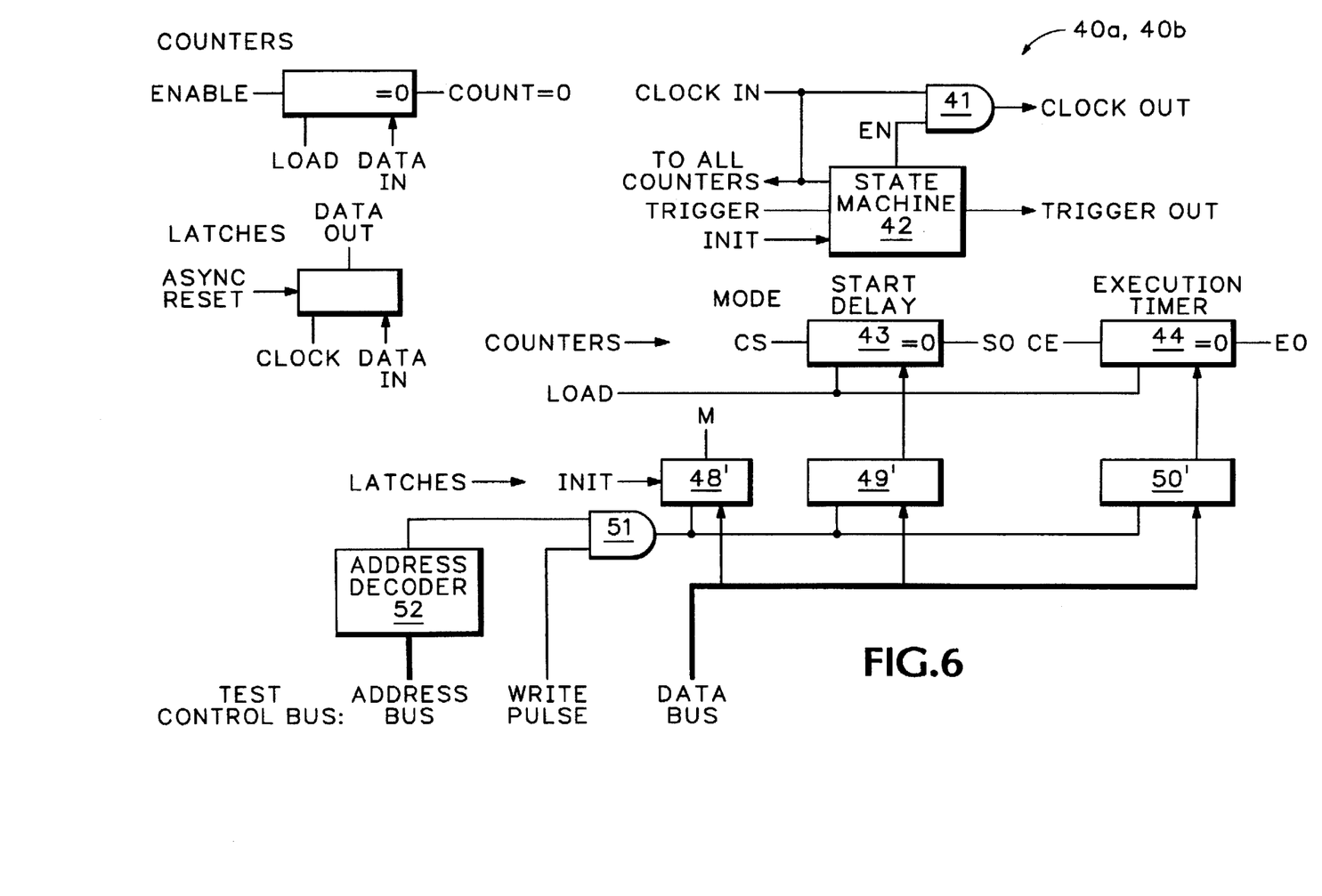
FIG. 6 is a block diagram of a clock controller according to the present invention suitable for being supplied with test data via a parallel test data bus.

Referring next to FIG. 6, the Clock Controllers 1 and 2, 40a,40b, are similar to Clock Controller 40 shown in FIG. 3, except that their state machine 42 is slightly different and their circuitry for receiving test data input is somewhat different in order to be compatible with the parallel Test Control Bus. The Test Control Bus consists of an address bus, a data bus, and a write pulse. Address Decoder 52 monitors the address bus and produces a high output when the local address is present. A write pulse input that goes high during the time that AND gate 51 is enabled by the high output of the Address Decoder 52 is passed by AND gate 51 to be the clock inputs to registers 48', 49', and 50'. As in the earlier embodiment, the data in registers 49' and 50' is loaded into the Start Delay counter 43 and Execution Timer counter 44, respectively, by a high-going LOAD signal. The M output of latch 48' operates as in the embodiment described above in connection with FIG. 3A.

Figure 7:
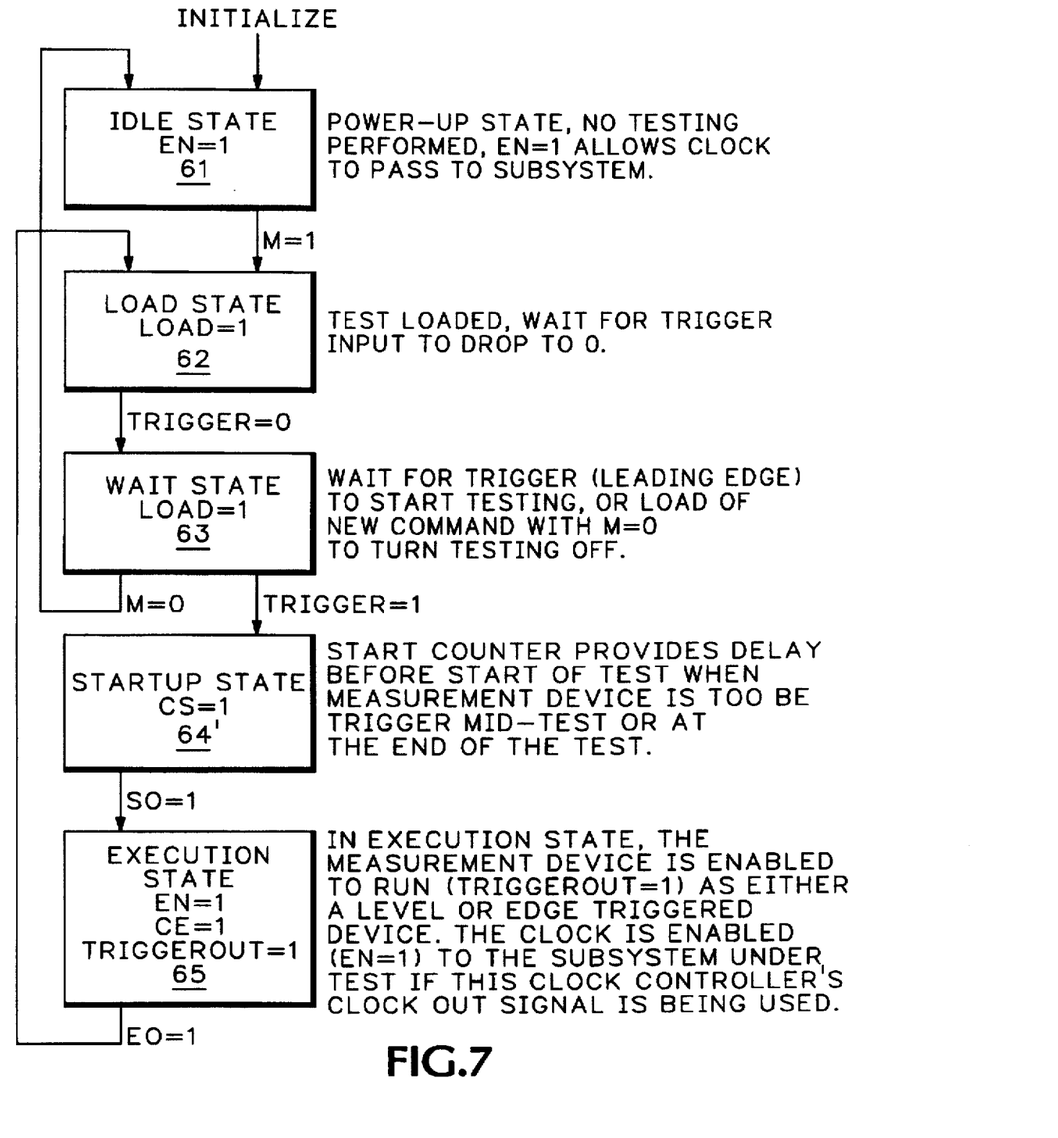
FIG. 7 is a state diagram illustrating the operation of a slightly different clock controller state machine.

Referring now to FIG. 7, only one state shown here differs from those shown in FIG. 4; the Startup State 64'. In this embodiment of the invention, the Trigger Output does not go high during the Startup State 64', but rather only in the Execution State 65. In this embodiment, the Trigger Output signal is used to enable the operation of a Measurement Device 31a or 31b (FIG. 5) starting at a time determined by the value that the Start Delay counter 43 receives from register 49' (FIG. 6). The Measurement Device 31a or 31b can be either edge triggered or level triggered. As before in the earlier described embodiment, a high EN is generated during the Execution State 65.

The implementations thus far described assume Timing Analyzers 30 or Measurement Devices 31a/31b which when once triggered continue to run until their internal test program is complete. For Timing Analyzers 30 or Measurement Devices 31a/31b that are level enabled and require a continuous enable high input in order to complete their program activities, an additional Finishing State can be provided after the Execution State 65 during which TRIGGER OUT=1, EN=0, an additional signal for controlling another counter is true. An additional latch is needed to provide the timing information for the duration of this state to the additional counter.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true scope and spirit of the invention.

I claim:

1. An embedded electronic system having internal test capabilities, the system comprising:

a subsystem under test, the subsystem under test being embedded in a matrix material and having a subsystem clock input for receiving a gated clock, a test data bus connection for receiving test data and returning test results, and a test point;

electrical testing means, the electrical testing means being embedded in the matrix material and having a clock input for receiving a system clock signal, a test data bus connection for receiving test data and returning test results, a trigger/enable input for receiving trigger signals, and a subsystem under test monitoring input coupled to the test point of the subsystem under test; and a clock controller, the clock controller being embedded in the matrix material and having a clock input for receiving system clock signals, a test data bus connection for receiving test data and returning test results data, a trigger input for receiving trigger signals, a trigger output coupled to the trigger/enable input of the electrical testing means, and a gated clock output coupled to supply a gated clock to the subsystem clock input of the subsystem under test.

2. An embedded electronic system according to claim 1 wherein the test data bus connection is compatible with a serial data bus.

3. An embedded electronic system according to claim 1 wherein the test data bus connection is compatible with a parallel data bus.

4. An embedded electronic system according to claim 1 wherein in the absence of test commands the clock controller supplies clock signals on the gated clock output.

5. An embedded electronic system according to claim 1 wherein during testing the clock controller is capable of producing a trigger output before producing active gated clock output.

6. An embedded electronic system according to claim 1 wherein additional test commands can be loaded while a test is being performed.

7. An embedded electronic system according to claim 1 wherein tests can be repeated without reloading test data by a second occurrence of a trigger input.

8. An embedded electronic system according to claim 1 further comprising:

a second electrical testing means, the second electrical testing means being embedded in the matrix material and having a clock input for receiving a system clock signal, a test data bus connection for receiving test data and returning test results, a trigger/enable input for receiving trigger signals, and a subsystem under test monitoring input coupled to the test point of the subsystem under test; and a second clock controller, the second clock controller being embedded in the matrix material and having a clock input for receiving system clock signals, a test data bus connection for receiving test data and returning test results data, a trigger input for receiving trigger signals, and a trigger output coupled to the trigger/enable input of the electrical testing means.

9. An embedded electronic system according to claim 6 wherein during testing the clock controller is capable of producing during testing an active gated clock output before a trigger output is produced by the second clock controller.

* * * * *